(12) United States Patent
Costa et al.

(10) Patent No.: US 9,725,558 B2
(45) Date of Patent: Aug. 8, 2017

(54) PROCESS TO PREPARE A CYCLIC OLIGOMER AND A CYCLIC OLIGOMER OBTAINABLE THEREBY

(71) Applicant: Sulzer Chemtech AG, Winterthur (CH)

(72) Inventors: Liborio Ivano Costa, Winterthur (CH); Philip Nising, Oetwil am See (CH); Francesca Tancini, Wettingen (CH); David Pfister, Zürich (CH); Giuseppe Storti, Zürich (CH); Massimo Morbidelli, Zürich (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 14/773,480

(22) PCT Filed: Nov. 27, 2013

(86) PCT No.: PCT/EP2013/074883
§ 371 (c)(1),
(2) Date: Sep. 8, 2015

(87) PCT Pub. No.: WO2014/139603
PCT Pub. Date: Sep. 18, 2014

(65) Prior Publication Data
US 2016/0017093 A1    Jan. 21, 2016

(30) Foreign Application Priority Data
Mar. 15, 2013 (EP) .................... 13159395

(51) Int. Cl.
*C08G 63/91* (2006.01)
*C08G 63/78* (2006.01)
*C08G 63/181* (2006.01)
*C08G 63/16* (2006.01)

(52) U.S. Cl.
CPC ............ *C08G 63/916* (2013.01); *C08G 63/16* (2013.01); *C08G 63/181* (2013.01); *C08G 63/78* (2013.01)

(58) Field of Classification Search
CPC .... C08G 63/181; C08G 63/78; C08G 63/916; C08G 63/85; C08G 63/16; C08G 63/83; C08G 63/84; C08G 63/82; C08G 63/87
See application file for complete search history.

(56) References Cited

U.S. PATENT DOCUMENTS

| 2,551,731 | A | 5/1951 | Gordon |
| 5,039,783 | A | 8/1991 | Brunelle et al. |
| 8,143,355 | B2 | 3/2012 | Matsuda et al. |
| 2007/0216067 | A1 | 9/2007 | Bahr et al. |

FOREIGN PATENT DOCUMENTS

| EP | 1595893 A1 | 11/2005 |
| WO | 2010077133 A1 | 7/2010 |

OTHER PUBLICATIONS

Brunelle "Synthesis and Polymerization of Cyclic Polyester Oligomers", Abstract, Chapter 3, Modern Polyesters Jun. 2004.*
Brunelle "Synthesis and Polymerization of Cyclic Polyester Oligomers", Article, Chapter 3, Modern Polyesters Jun. 2004.*
Medvedeva et al "Mixed Polyesters of ethylene glycol with 2,5-furandicarboxylic and terephthalic acids" Soviet plastics Feb. 1963.*
Daniel J. Brunelle "Semicrystalline Polymers via Ring-Opening Polymerization:Preparation and Polymerization of Alkylene Phthalate Cyclic Oligomers" 1998.*
Zhu et al "Poly(butylene 2,5-furan dicarboxylate), a Biobased Alternative to PBT: Synthesis, Physical Properties, and Crystal Structure" Macromolecules , Published Jan. 24, 2013.*
Brunelle, D. et al. "Semicrystalline Polymers via Ring-Opening Polymerization: Preparation and Polymerization of Alkylene Phthalate Cyclic Oligomers" Macromolecules, 1998, pp. 4782-4790, vol. 31.
Bryant, J.J.L. et al. "Cyclic polyesters: 7. Preparation and characterization of cyclic oligomers from solution ring-chain reactions of poly(butylene terephthalate)" Polymer, 1997, pp. 4531-4537, vol. 38, No. 17.
Burch, R. et al. "Synthesis of Cyclic Oligoesters and Their Rapid Polymerization to High Molecular Weight" Macromolecules, 2000, pp. 5053-5064, vol. 33.
Burgess, S. et al. "Chain Mobility, Thermal, and Mechanical Properties of Poly(ethylene furanoate) Compared to Poly(ethylene terephthalate)" Macromolecules, 2014, pp. 1383-1391, vol. 47.
de Jong, E. et al. "Furandicarboxylic Acid (FDCA), A Versatile Building Block for a Very Interesting Class of Polyesters" American Chemical Society, 2012, pp. 1-13.
Goodman, I. et al. "The Structures and Reversible Polymerization of Cyclic Oligomers from Poly (ethylene terephthalate)" Imperial Chemical Industries Limited, Fibres Division, 1960, pp. 384-396.
Morales-Huerta, J. et al. "Poly(alkylene 2,5-furandicarboxylate)s (PEF and PBF) by ring opening polymerization" Polymer, 2016, pp. 148-158, vol. 87.
Peebles, L. et al. "Isolation and Identification of the Linear and Cyclic Oligomers of Poly (ethylene Terephthalate) and the Mechanism of Cyclic Oligomer Formation" Journal of Polymer Science, 1969, pp. 479-496, vol. 7.
Wick, G. et al. "Cyclische Oligomere in Polyestern aus Diolen und aromatischen Dicarbonsauren" Die Angewandte Makromolekulare Chemie, 1983, pp. 59-94, vol. 112—English Abstract Attached.

* cited by examiner

*Primary Examiner* — Ling Choi
*Assistant Examiner* — Gennadiy Mesh
(74) *Attorney, Agent, or Firm* — Larson & Anderson, LLC

(57) ABSTRACT

A process to prepare a cyclic polyester oligomer composition having a cyclic polyester oligomer having furanic units, includes the step of reacting a monomer component, for example, 2,5-furan dicarboxylic acid and, for example, ethylene glycol, in a ring closing oligomerization at a reaction temperature and reaction time, for example, at 100° C. to 350° C. for 30 to 600 minutes to obtain a cyclic polyester oligomer having furanic units. The process yields a cyclic polyester oligomer composition which can be used in further ring-opening polymerization reactions to produce a polyester polymer. The cyclic polyester oligomer composition has a cyclic polyester oligomer having furanic units and less than 5% linear oligomeric polyester species in the composition.

17 Claims, 10 Drawing Sheets

Fig. 5a (top) and 5b (bottom)

Fig. 9a (top) and 9b (bottom)

PROCESS TO PREPARE A CYCLIC OLIGOMER AND A CYCLIC OLIGOMER OBTAINABLE THEREBY

BACKGROUND OF THE INVENTION

The present invention relates to a process to prepare a cyclic polyester oligomer composition comprising a cyclic polyester oligomer having furanic units, as well as said cyclic polyester oligomer composition obtainable by said process and the use of said cyclic polyester oligomer composition in the production of a polyester polymer.

Polyesters are an important class of commercial polymers with useful physical and mechanical properties and numerous applications. Polyesters find wide utility, for example, as fibres, coatings, films, or in composites. Most industrial polyesters such as polyethylene terephthalate (PET), polybutylene terephthalate (PBT), and polyacrylates are produced from monomers derived from petrochemical feedstocks. Due to limited oil reserves, fluctuations of oil price, political instability in some production areas, and increased environmental awareness, there is growing interest for biobased polyesters produced from renewable feedstocks.

Currently, there are only few biobased polyesters in commercial or pilot production. Representative examples of naturally-occurring polyesters are polyhydroxyalkanoates (PHA), which are linear polyesters produced by microbial fermentation from sugars or lipids. However PHA has not been widely industrialized due to limitations in production yields and downstream processing.

Another example of an commercially-produced biobased semisynthetic polyester is polylactic acid (PLA), which may be prepared from polycondensation of lactic acid or ring-opening polymerization of the cyclic diester lactide. Although PLA has a wide range of applications, it is an aliphatic polyester and therefore not suitable for replacing petrochemical-based aromatic polyesters in applications such as higher temperature extrusion or molding or the production of bottles. Since most biobased building blocks are derived from non-aromatic compounds such as sugars or starch, most biobased polymers suffer this disadvantage. Examples of other such aliphatic biobased polymers include polybutylene succinate (PBS) or polymers based on sebacic or adipic acids.

For these reasons, biobased polymers having aromatic building blocks are highly sought today. An interesting class of biobased aromatic monomers are the furanics such as furan-2,5-dicarboxylic acid (FDA), 5-(hydroxymethyl)furan-2-carboxylic acid (HMFA), and 2,5-bis(hydroxymethyl)furan (BHMF), which may be prepared from the intermediates furfural (2-furan carboxaldehyde) and 5-hydroxymethyl 2-furan carboxaldehyde (HMF) which may be produced by the acid-catalyzed thermal dehydration of pentoses (C5) and hexoses (C6). The chemical similarity of the furan ring to the phenyl ring makes it possible to replace phenyl-based polymers such as polyethylene terephthalate (PET) by furan-based polymers.

The production of polyesters from furanic building blocks by polycondensation reactions involving heating a mixture of diols and diacids or diesters (monomers) at high temperatures in the presence of organometallic or acid catalyst is known, for example, from U.S. Pat. No. 2,551,731 and U.S. Pat. No. 8,143,355 B2. To allow the progress in this equilibrium reaction towards the formation of the polymer, the formed water or side products such as alcohol must be removed, typically by reduced pressure or gas streams at elevated temperatures in the process. Therefore complex and costly reaction and devolatilization equipments effective at driving the reaction to completion, devolatilizing significant amounts of volatile compounds from highly viscous polymer melts, and having the capacity to remove and condense these volatile compounds are required. If the polycondensation and devolatilization is insufficient, then high molecular weight polyester having useful mechanical and other properties will not be produced.

Furthermore the high temperatures and long residence times used for (i) driving the polymerization of these diol and diacid or diester monomers and (ii) devolatilization of the resulting polymer lead often to undesired side reactions such as degradation of the monomer, oligomer or polymer, formation of intermolecular bonds leading to branching, and oxidation of the final product with the consequent color development. In addition, significant amounts of volatile organic compounds such as alcoholic side products cannot simply be emitted to the atmosphere, and they must be instead recovered for recycling to make new monomer or for thermal recycling. This recovery and recycling to make new monomer entails costly storage and transport aspects unless the polymerization plant is integrated with an on-site monomer production plant.

In conclusion, it would be desirable to have alternative raw materials to the diol and diacid or diester monomers conventionally used to prepare polyesters from furanic building blocks in industrial scale polymerization plants. Particularly desirable are ones that do not produce large quantities of water or alcoholic side products. Such alternative raw materials would then not require complex reaction and high-capacity devolatilization equipment or harsh high temperature reaction and devolatization steps to drive the polymerization to completion. Therefore such alternative raw materials would allow high molecular weight polymers having furanic units to be readily produced from furanic building blocks under mild conditions.

SUMMARY OF THE INVENTION

Starting from this state of the art, it is an object of the invention to provide a process to prepare alternative raw materials (a cyclic polyester oligomer having furanic units) for producing polyester polymers having furanic units and that do not suffer from the previous mentioned deficiencies, particularly a tendency to form large quantities of volatile side products such as water or alcohol, which requires complex and costly high-capacity devolatilization systems, especially when producing high molecular weight polyester polymers. A related object is provide such alternative raw materials that avoid thermal degradation and polymer discoloration due to harsh polymerization and devolatization conditions of high temperatures and long times. Further objects of the invention include providing a cyclic polyester oligomer composition obtainable by said process and a use of said cyclic polyester oligomer composition in the production of a polyester polymer.

In the present invention, "furanic units" refers to furan derivatives such as those based on the monomers FDA, HMFA, BHMF and their partially or fully reacted monoester or diester derivatives. Having furanic units means that the fully or partially reacted derivative of such monomers is incorporated into the cyclic polyester oligomer.

According to the invention, these objects are achieved by a process to prepare a cyclic polyester oligomer composition comprising a cyclic polyester oligomer having furanic units, wherein the process comprises:

a step of either:

(I) reacting a monomer component $C^1$ or $D^1$ in the presence of an optional catalyst and/or optional organic base in a ring closing oligomerization step under conditions of a reaction temperature and reaction time sufficient to yield a cyclic polyester oligomer having furanic units of structure $Y^1$, wherein the monomer component $C^1$ comprises the structure

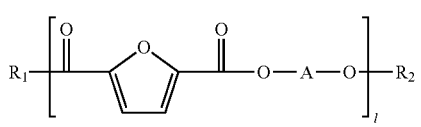

and wherein each of the groups A is an optionally-substituted linear, branched or cyclic alkyl, phenyl, aryl, or alkylaryl, and wherein l is an integer from 1 to 100, preferably 2 to 50, most preferably 3 to 25, and wherein
$R_1$=OH, OR, halogen, or O-A-OH,
R=optionally substituted linear, branched or cyclic alkyl, phenyl, aryl or alkylaryl,
$R_2$=H or

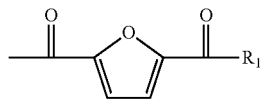

wherein the monomer component $D^1$ comprises the structures

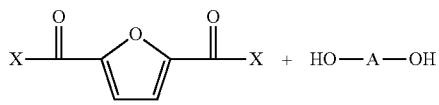

and wherein A is an optionally-substituted linear, branched or cyclic alkyl, phenyl, aryl, or alkylaryl, and wherein each of the groups X is an OH, a halogen, or an optionally-substituted alkyloxy, phenoxy, or aryloxy, and wherein the groups X are not OH when A is n-butyl, and wherein the structure $Y^1$ of the cyclic polyester oligomer having furanic units is

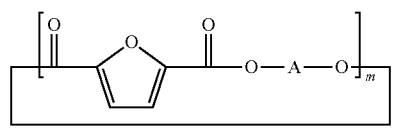

wherein m is an integer from 1 to 20, preferably 2 to 15, most preferably 3 to 10,
OR (II) reacting a monomer component $C^2$ or $D^2$ in the presence of an optional catalyst and/or optional organic base in a ring closing oligomerization step under conditions of a reaction temperature and reaction time sufficient to yield a cyclic polyester oligomer having furanic units of structure $Y^2$, wherein the monomer component $C^2$ comprises the structure

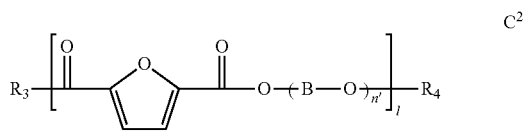

and wherein each of the groups B is an optionally-substituted linear, branched or cyclic alkyl, phenyl, aryl, or alkylaryl, wherein l is an integer as defined above, and wherein n' is an integer from 1 to 20, preferably 2 to 10, and wherein
$R_3$=OH, OR, halogen, or O—(B—O)$_{n'}$—H,
R=optionally substituted linear, branched or cyclic alkyl, phenyl, aryl or alkylaryl,
$R_4$=H or

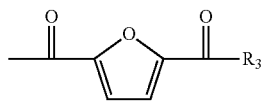

wherein the monomer component $D^2$ comprises the structures

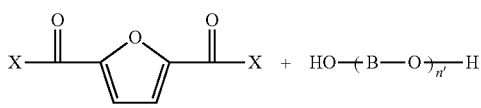

and wherein each of the groups X is an OH, a halogen, or an optionally-substituted alkyloxy, phenoxy, or aryloxy, each of the groups B is an optionally-substituted linear, branched or cyclic alkyl, phenyl, aryl, or alkylaryl, and n' is an integer as defined above,
and wherein the structure $Y^2$ of the cyclic polyester oligomer having furanic units is

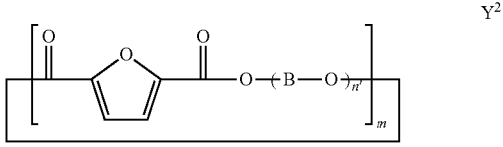

wherein each of the groups B is an optionally-substituted linear, branched or cyclic alkyl, phenyl, aryl, or alkylaryl, n' is an integer as defined above, and m is an integer from 1 to 20, preferably 2 to 15, most preferably 3 to 10,
AND
a subsequent step (III) in which linear oligomeric polyester species having furanic units are separated and removed from the cyclic oligomeric composition.

According to the invention, these further objects are achieved firstly by a cyclic polyester oligomer composition obtainable by said process, wherein the composition contains less than 5, preferably 3, most preferably 1 weight % of linear oligomeric polyester species based on the total weight of the composition.

Said cyclic polyester oligomer is used in accordance with the invention in the production of a polyester polymer.

The present invention achieves these objects and provides a solution to this problem by means of a process to prepare a cyclic oligomer composition comprising a cyclic polyester oligomer having furanic units and having either structure $Y^1$ or $Y^2$. These cyclic oligomers are prepared by condensation reactions carried out to high conversion and with linear impurities removed, and thus they do not contain carboxylic acid or free OH groups, as would monomers such as 2,5-furandicarboxlic acid or ethylene glycol, propanediol or butanediol. Therefore the further reaction of the cyclic oligomers of the invention to form a high molecular weight polymer will not release large amounts of water as do those monomers. These cyclic oligomers also do not contain esters of volatile monofunctional alcohols, as does 2,5-furandicarboxlic acid dimethyl or diethyl ester. Therefore the further reaction of these cyclic oligomers of the invention to form a high molecular weight polymer will not release large amounts of volatile alcoholic byproducts as do those monomers.

The lack of production of large quantities of volatile water or alcohol components during the polymerization of the present cyclic oligomer composition and any subsequent devolatilization of the polymer produced allows simpler devolatilization systems and milder devolatilization conditions to be used. This is because only relatively small amounts of volatile compounds will be present in the polymer composition after polymerization of the cyclic oligomer. In particular, due to its molecular weight, the cyclic oligomer is not very volatile. Furthermore since the cyclic oligomer lacks free acid and/or hydroxyl groups, residual unreacted cyclic oligomer species will not negatively impact the chemical, color, and thermal stability of the polymer composition. Thus due to its design and nature, the cyclic polyester oligomer conveniently allows a high molecular weight polymer to be prepared under relatively mild conditions of time and temperature for both the polymerization reaction and the devolatilization such that significant thermal degradation of the polymer composition may be avoided.

These results are then surprisingly achieved without the need for any special elaborate polymerization reaction or polymer devolatilization apparatuses involving the application of vacuum and/or inert gas (e.g. nitrogen) streams at elevated temperatures over long periods of time. In the present invention the reactions and operations involving the formation of significant volatile species such as water and alcohols have all been conveniently moved upstream to the cyclic polyester oligomer production stage or plant, and thus only relatively small amounts of such volatile species will be generated in the subsequent polymerization process or plant. In this manner the removal and recovery and/or recycle of such species is integrated within the oligomer production facility. This then eliminates the need for the transport of such materials between monomer and polymer production plants, which may be geographically quite distant from one another.

In a preferred embodiment of the process, the monomer component is $C^1$ and A is an optionally-substituted linear, branched or cyclic alkyl, l is an integer from 3 to 25, and m is an integer from 3 to 10, and the monomer component is $D^1$ and A is an optionally-substituted linear, branched or cyclic alkyl, X is a halogen, or optionally-substituted alkyloxy or phenoxy, and m is as defined above, and the monomer component is $C^2$ and wherein B is an optionally-substituted linear, branched or cyclic alkyl, l and m are integers as defined above, and n' is an integer from 2 to 10, OR the monomer component is $D^2$, X is an OH, a halogen, or optionally-substituted alkyloxy, phenoxy, or aryloxy, B is an optionally-substituted linear, branched or cyclic alkyl, or phenyl, and n' and m are integers as defined above. Not only are the smaller and lower molecular weight cyclic species produced industrially applicable, but it is easier to produce smaller cyclics, and easier to separate and purify them from linear species because of their "narrower" Mw fraction. In addition, the use of acid halide reactants, such as acid chlorides when X is Cl, or ester reactants, such as methyl esters when X is methoxy, has both more favourable kinetics and equilibrium than does the reaction of a carboxylic acid with an alcohol. However halogenated species may be corrosive and thus require special expensive construction materials for the subsequent polymerization plant. Therefore their content in the cyclic polyester oligomer composition of the invention will preferably be kept low, e.g. by removal during the subsequent separation and removal step.

In this application, "optionally-substituted" refers to chemical substituents that are different from hydrogen, alkyl, aryl or alkylaryl groups. Such optional substituents will be generally inert during the ring-closing oligomerization step and may be for example, halogens or ethers.

In a specific preferred embodiment of the process, either
  the monomer component is $C^1$ and A is an optionally-substituted linear, branched or cyclic $C_1$ to $C_6$ alkyl, and l is an integer from 3 to 25, and m is an integer from 3 to 10,
  the monomer component is $D^1$ and A is an optionally-substituted linear, branched or cyclic $C_1$ to $C_6$ alkyl, X is a halogen, or optionally-substituted alkyloxy or phenoxy, and m is an integer as defined above,
  the monomer component is $C^2$ and wherein B is an optionally-substituted linear, branched or cyclic $C_1$ to $C_6$ alkyl, l and m are integers as defined above and n' is an integer from 2 to 10, OR
  the monomer component is $D^2$, X is a halogen, or an optionally-substituted alkyloxy, phenoxy, or aryloxy, B is an optionally-substituted linear, branched or cyclic $C_1$ to $C_6$ alkyl, or phenyl, and n' and m are integers as defined above. This embodiment does not involve the reaction of acidic species, so the reaction kinetics and equilibrium are quite favourable and no water byproduct is produced. Furthermore acidic monomer species, as well as their acid halide derivatives, may be corrosive and thus require special expensive construction materials for the subsequent polymerization plant.

In another preferred embodiment of the process, either the monomer component is $C^1$ or $C^2$ and the reaction temperature is from 100 to 350, preferably 150 to 300, most preferably 180 to 280° C., and wherein the reaction time is from 30 to 600, preferably, 40 to 400, most preferably 50 to 300 minutes, OR wherein the monomer component is $D^1$ or $D^2$ and the reaction temperature is from −10 to 150, preferably −5 to 100, most preferably 0 to 80° C., and wherein the reaction time is from 5 to 240, preferably 10 to 180, most preferably 15 to 120 minutes. It has been found that such reaction times and temperatures for these monomer components are sufficient to allow the desired cyclic polyester oligomer composition to be produced in high yield but avoid the occurrence of significant formation of linear species or thermal degradation of the oligomer composition.

In yet another preferred embodiment of the process, either the monomer component $C^1$ comprises the specific structure

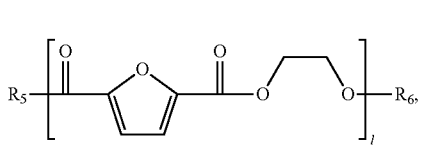

or the monomer component $D^1$ comprises the specific structure

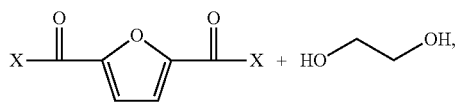

and $Y^1$ has the specific structure

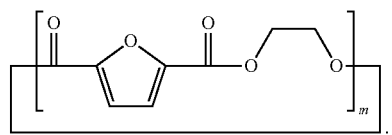

wherein
$R_5$=OH, OR, halogen, or O—$CH_2CH_2$—OH,
R=optionally substituted linear, branched or cyclic alkyl, phenyl, aryl or alkylaryl,
$R_6$=H or

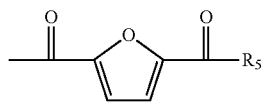

and X, l, and m are defined as indicated earlier.

This embodiment has the advantage of producing a raw material for the preparation of poly(2,5-ethylene furandicarboxylate) (PEF), which is the heterocycle homologue of the most important commercial polyester, poly(ethylene terephthalate) (PET). PEF is currently in pilot-scale development and shows potential as a biobased alternative to PET for packaging and bottle applications.

In an alternative other preferred embodiment of the process, either the monomer component $C^1$ comprises the specific structure

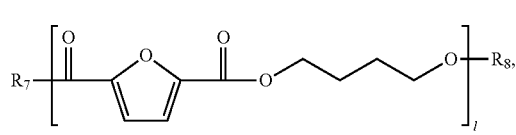

or the monomer component $D^1$ comprises the specific structure

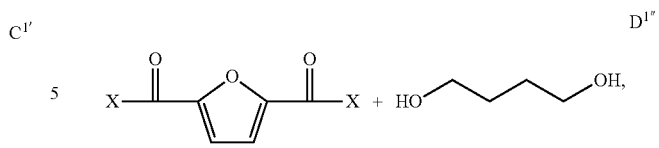

and $Y^1$ has the specific structure

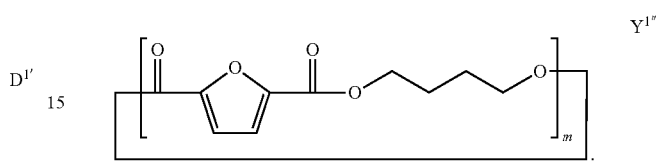

wherein
$R_7$=OH, OR, halogen, or O—$CH_2CH_2CH_2CH_2$—OH,
R=optionally substituted linear, branched or cyclic alkyl, phenyl, aryl or alkylaryl,
$R_8$=H or

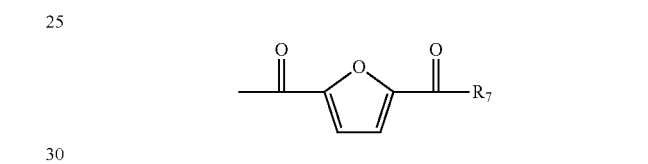

and X, l, and m are defined as indicated earlier. This process has the advantage of producing a raw material for the preparation of poly(2,5-butylene furandicarboxylate) (PBF), which is the heterocycle homologue of another important commercial polyester, poly(butylene terephthalate) (PBT). PBT has excellent mechanical and electrical properties with robust chemical resistance, and PBF is of interest as a biobased alternative.

In the present invention, a "catalyst" refers to an inorganic or metal-containing compound such as an organometallic species or a metal salt; whereas an "organic base" refers to a non-metallic and basic organic species.

In still another preferred embodiment of the process, the optional organic base E is present and it is a compound having the structure

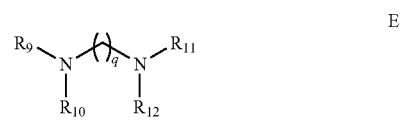

wherein each of the groups $R_9$ to $R_{12}$ are hydrogen, optionally-substituted alkyl, phenyl, aryl, or alkaryl, and wherein each of the groups $R_9$ to $R_{12}$ may optionally be bonded together by a single or double bond group as part of a cyclic substituent in a cyclic optional organic base E. This embodiment provides an advantageous benefit in that the inventors have surprisingly found that such unhindered amines give high yield of the desired cyclic oligomer species. In other embodiments, the optional organic base may be a linear, branched, or cyclic aliphatic monobasic species containing only one nitrogen.

In a more specifically preferred embodiment of the process, the optional organic base E is present and it is either: DABCO, having the structure:

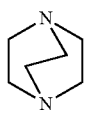

OR DBU, having the structure:

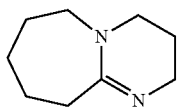 [SMILES: C1CCC2=NCCCN2CC1]

and either DABCO or DBU are optionally used together with an alkyl amine, more preferably triethylamine. In other specific embodiments, DABCO and DBU are used together in a mixture, optionally with an alkyl amine. Such embodiments have the advantage that these are commercial bases available on a large scale, and the inventors have found that their handling is convenient in the process of the invention. Furthermore the optional inclusion of alkyl amine species beneficially neutralizes any acidic byproducts formed in the process.

In yet another preferred embodiment of the process, the optional catalyst is either absent or it is present as a metal alkoxide or metal carboxylate, preferably one of tin, zinc, titanium, or aluminum. The lack of a catalyst reduces the cost of raw materials and simplifies the purification and further use of the cyclic polyester oligomer. However some metal-based catalysts have been found by the inventors to be highly effective in the process of the invention thus allowing the cyclic polyester oligomer compositions to be prepared under relatively mild conditions of temperature and time. This then improves productivity and minimizes degradation and discoloration in the process.

In a specific preferred embodiment of the process, the optional organic base E is present in a stoichiometric ratio of from 0.5 to 6, preferably 1 to 4, more preferably 2 to 3 mol relative to 1 mol of all monomer component species used as a reactant in the process. The use of such optional organic base loading has been found to allow the ring-closing oligomerization to take place under relatively mild conditions of temperature and time while avoiding the catalysis of undesired side reactions during the process. Furthermore contamination is avoided of the polyester oligomer composition product by large quantities of unquenched residual catalysts, which may lead to degradation and/or discoloration in subsequent thermal processing such as polymerization or extrusion or molding of the resulting polymer. Also an effective balance between catalyst cost and productivity is obtained.

In another preferred embodiment of the process, the step (III) in which linear oligomeric polyester species having furanic units are separated and removed from the cyclic oligomeric composition comprises one or more separation sub-steps of passing a mobile phase of the cyclic oligomeric composition through a stationary phase, selective precipitation, distillation, extraction, crystallization or their combinations. The inventors have found these separation methods to be efficient and effective in removing linear polyester oligomers and thus purifying the cyclic oligomeric composition. In addition these separation methods are readily industrially applicable for purification on a commercial scale, and they are cost effective.

Another aspect of the invention concerns a cyclic polyester oligomer composition obtainable by a process according to the invention, wherein the composition contains less than 5%, preferably 3, most preferably 1 weight % of linear oligomeric polyester species relative to the total weight of the cyclic polyester oligomer composition. The composition containing such low levels of linear species is advantageous in that the subsequent polymerization may be carried out efficiently and reproducibly. Large and/or variable levels of linear species in the cyclic oligomer composition may change the subsequent polymerization stoichiometry and thus affect the obtainable molecular weight upon polymerization. In addition, acidic, alcoholic, or ester end groups of linear species may react to disadvantageously release volatile species during polymerization. Furthermore reactive acidic species may act to quench the basic catalysts and/or be corrosive to processing equipment.

In a preferred embodiment of the composition, the content of residual monomer components, such as $C^1$, $D^1$, $C^2$, or $D^2$, in the cyclic polyester oligomer composition is less than 5, preferably 3, and most preferably 1 weight percent based on the total weight of the composition.

In a preferred embodiment of the cyclic polyester oligomer composition, the cyclic polyester oligomer composition contains a halogenated impurity, preferably an acid chloride and/or its residue. A residue is defined here as a reaction product or byproduct, for example, a halogen acid such as HCl or a halogen salt such as a chloride salt. Such impurities are a byproduct of the use of acid halide reactants, such as acid chlorides, which have both more favourable kinetics and equilibrium in the production of the oligomer composition than does the reaction of a carboxylic acid with an alcohol. However halogenated species may be corrosive and thus require special expensive construction materials for the subsequent polymerization plant. Therefore their content in the cyclic polyester oligomer composition of the invention will preferably be kept low, e.g. by removal during the subsequent separation and removal step.

In another preferred embodiment of the cyclic polyester oligomer composition, the composition comprises the specific cyclic polyester oligomer having furanic units and of structure $Y^{1'}$

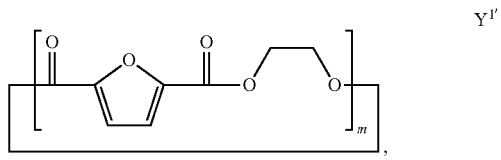

wherein m is an integer from 1 to 20, preferably 2 to 15, most preferably 3 to 10. This embodiment is a suitable raw material for producing poly(2,5-ethylene furandicarboxylate) (PEF), and thus has the advantages previously discussed in relationship to the process to produce this oligomer composition.

In an alternative preferred embodiment of the cyclic polyester oligomer composition, the composition comprises the specific cyclic polyester oligomer having furanic units and of structure $Y^{1''}$

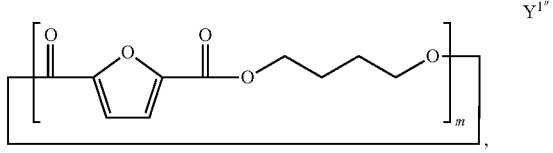

wherein m is an integer from 1 to 20, preferably 2 to 15, most preferably 3 to 10. This embodiment is a suitable raw material for producing poly(2,5-ethylene furandicarboxylate) (PBF), and thus has the advantages previously discussed in relationship to the process to produce this oligomer composition.

Another aspect of the invention is a process to produce a polyester polymer comprising (i) the process of the invention to prepare a cyclic oligomer composition comprising a cyclic polyester oligomer having furanic units together with (ii) a subsequent polymerization step to produce a polyester polymer. A related aspect of the invention is the use of the cyclic polyester oligomer composition of the invention in the production of a polyester polymer. This polymerization process and use advantageously utilize the desirable properties of the oligomer composition as a raw material in a polymerization process, such as the favourable kinetics, lack of corrosive acidic species, and lack of formation of significant quantities of volatile species during the polymerization.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one process claim may be combined with the subject matter of one or more other process claims or the subject matter of one or more composition claims or the subject matter of a mixture of one or more process claims and composition claims. By analogy, the subject matter of any one composition claim may be combined with the subject matter of one or more other composition claims or the subject matter of one or more process claims or the subject matter of a mixture of one or more process claims and system claims.

One skilled in the art will understand that the combination of the subject matters of the various embodiments of the invention is also possible without limitation in the invention to the extent that such combinations are technically feasible.

BRIEF DESCRIPTION OF THE DRAWINGS

The invention will be explained in more detail hereinafter with reference to various embodiments of the invention as well as to the drawings. The schematic drawings show.

DETAILED DESCRIPTION OF THE INVENTION

Figure 1:
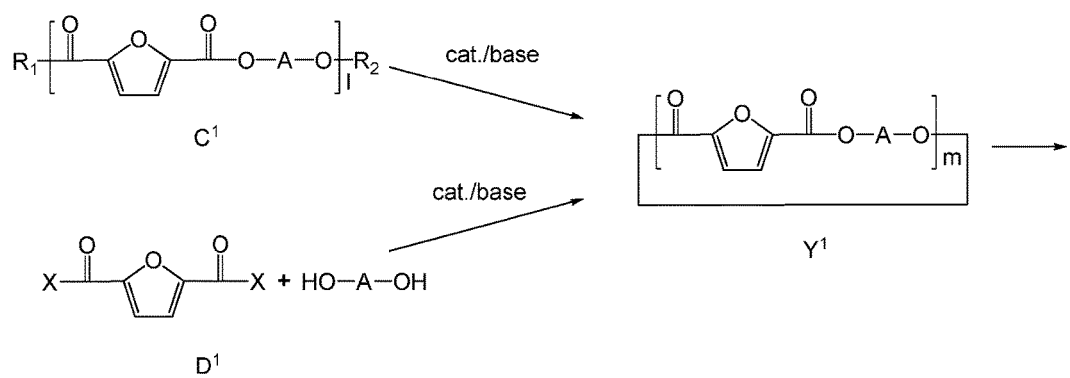
FIG. 1 shows a reaction scheme for the synthesis of a cyclic polyester oligomer having furanic units of structure $Y^1$ from the reaction of a monomer component $C^1$ or $D^1$ in a ring closing oligomerization step.

The claimed invention relates to a process to prepare a cyclic polyester oligomer composition comprising a cyclic polyester oligomer having furanic units, the cyclic polyester oligomer having either structure $Y^1$ or $Y^2$:

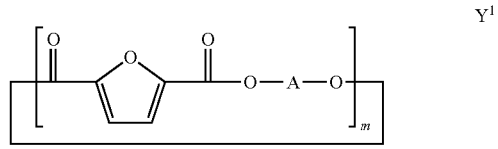

wherein A is an optionally-substituted linear, branched or cyclic alkyl, phenyl, aryl, or alkylaryl, and m is an integer from 1 to 20, preferably 2 to 15, most preferably 3 to 10,

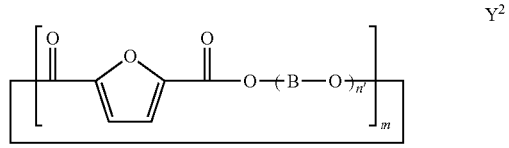

wherein each of the groups B is an optionally-substituted linear, branched or cyclic alkyl, phenyl, aryl, or alkylaryl, n' is an integer from 1 to 20, preferably 2 to 10, and m is an integer as defined above for $Y^1$.

The cyclic polyester oligomer composition of the current invention is not specifically limited and it may comprise other components in addition to the polyester polymer having furanic units and comprising the structure $Y^1$ or $Y^2$. For example, the cyclic polyester oligomer composition may additionally comprise small amounts of one or more unreacted and/or unremoved reaction components such as a monomer component (unreacted diacid, diol, or acidol reagents), a catalyst, a templating agent, a base, a catalyst quencher, a solvent, used in the preparation of the cyclic polyester oligomer. The amount of these impurities in the cyclic polyester oligomer will preferably be less than 10, more preferably less than 5, even more preferably less than 3, and most preferably less than 1 weight % based on the total weight of the cyclic polyester oligomer.

In addition, the cyclic polyester oligomer composition may additionally comprise low levels of impurities introduced as a contaminant in one of the reaction components or formed due to a side reaction during the ring-closing oligomerization step or an optional additional step such as a subsequent devolatization step. Examples of such impurities are linear oligomeric polyester species having furanic units. Finally the cyclic polyester oligomer composition may additionally comprise additional components such as typical monomer additives added during production or prior to use such as stabilizers against oxidation, thermal degradation, light or UV radiation. One skilled in the art will understand that blends with other monomers in order to combine the favorable properties of different monomers are also contemplated as being within the scope of the present invention.

One advantage of the cyclic polyester oligomer composition of the current invention is that in contrast with prior art raw materials for preparing polyesters, such as the direct reaction of diacid and diol or acidol monomers, the composition of the invention will contain little or no residue of such diacid, diol, or acidol monomers. Thus the cyclic polyester oligomer composition of the current invention has a high reactivity and favorable equilibrium characterized by the formation of only very low quantities of low molecular weight volatile byproducts during its subsequent polymerization processing.

In one embodiment, the content of diacid, diol, or acidol monomers in the cyclic polyester oligomer composition is less than 5 wt %, preferably less than 3 wt %, more preferably less than 1 wt %. In the present application, the content of diacid, diol, or acidol monomers refers to their content as measured by the extraction of soluble species followed by GC-MS analysis.

As shown in FIG. 1, the process of the invention to prepare the cyclic oligomer composition comprising a cyclic polyester oligomer of structure $Y^1$ having furanic units comprises the step of (I) reacting a monomer component $C^1$ or $D^1$ in the presence of an optional catalyst and/or optional organic base in a ring closing oligomerization step under conditions of a reaction temperature and reaction time sufficient to yield a cyclic polyester oligomer having furanic units of structure $Y^1$, wherein the monomer component $C^1$ comprises the structure

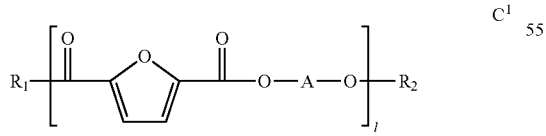

and wherein each of the groups A is an optionally-substituted linear, branched or cyclic alkyl, phenyl, aryl, or alkylaryl, and wherein l is an integer from 1 to 100, preferably 2 to 50, most preferably 3 to 25, and wherein $R_1$=OH, OR, halogen, or O-A-OH, R=optionally substituted linear, branched or cyclic alkyl, phenyl, aryl or alkylaryl, $R_2$=H or

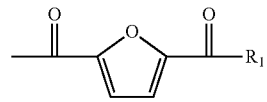

wherein the monomer component $D^1$ comprises the structures

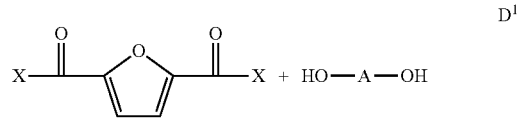

and wherein A is an optionally-substituted linear, branched or cyclic alkyl, phenyl, aryl, or alkylaryl, and wherein each of the groups X is an OH, a halogen, or an optionally-substituted alkyloxy, phenoxy, or aryloxy, and wherein the groups X are not OH when A is n-butyl.

Figure 2:
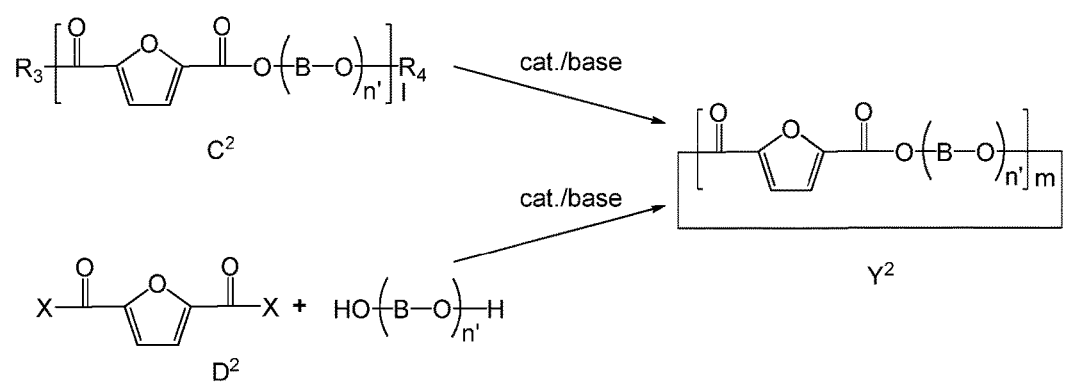
FIG. 2 shows a reaction scheme for the synthesis of a cyclic polyester oligomer having furanic units of structure $Y^2$ from the reaction of a monomer component $C^2$ or $D^2$ in a ring closing oligomerization step.

As shown in FIG. 2, the process of the invention to prepare the cyclic oligomer composition comprising a cyclic polyester oligomer of structure $Y^2$ having furanic units comprises the step of (II) reacting a monomer component $C^2$ or $D^2$ in the presence of an optional catalyst and/or optional organic base in a ring closing oligomerization step under conditions of a reaction temperature and reaction time sufficient to yield a cyclic polyester oligomer having furanic units of structure $Y^2$, wherein the monomer component $C^2$ comprises the structure

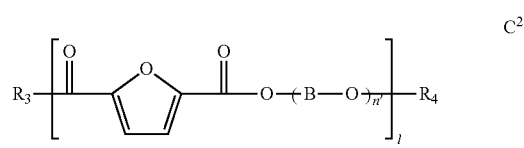

and wherein each of the groups B is an optionally-substituted linear, branched or cyclic alkyl, phenyl, aryl, or alkylaryl, wherein l is an integer as defined above, and wherein n' is an integer from 1 to 20, preferably 2 to 10, and wherein $R_3$=OH, OR, halogen, or O—(B—O)$_{n'}$—H, R=optionally substituted linear, branched or cyclic alkyl, phenyl, aryl or alkylaryl, $R_4$=H or

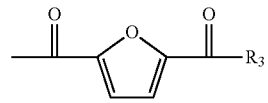

the monomer component $D^2$ comprises the structure

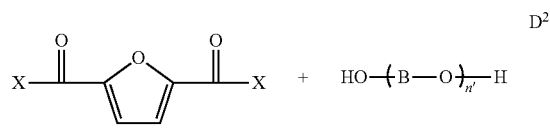

and wherein each of the groups X is an OH, a halogen, or an optionally-substituted alkyloxy, phenoxy, or aryloxy, each of the groups B is an optionally-substituted linear, branched or cyclic alkyl, phenyl, aryl, or alkylaryl, and n' is an integer as defined previously for $Y^2$.

In a step (III) subsequent to either (I) or (II), linear oligomeric polyester species having furanic units are separated and removed from the cyclic oligomeric composition.

Figure 3:
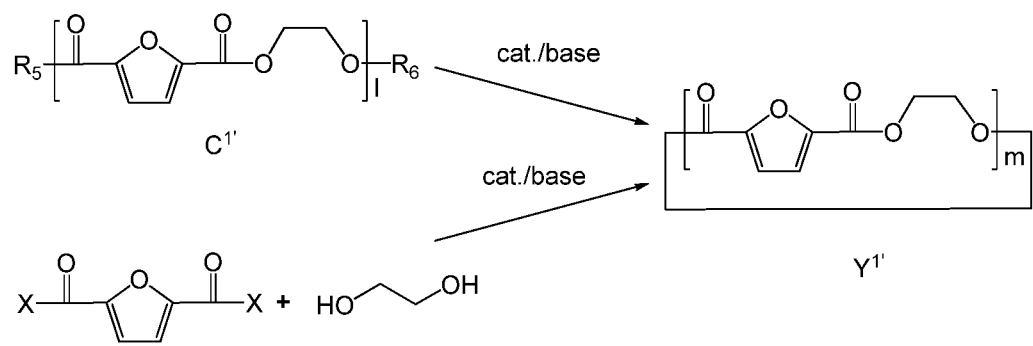
FIG. 3 shows a reaction scheme for the synthesis of a specific cyclic polyester oligomer useful in the production of PEF and having furanic units and of structure $Y^{1'}$ from the reaction of a specific monomer component $C^{1'}$ or $D^{1'}$ in a ring closing oligomerization step.
Figure 4:
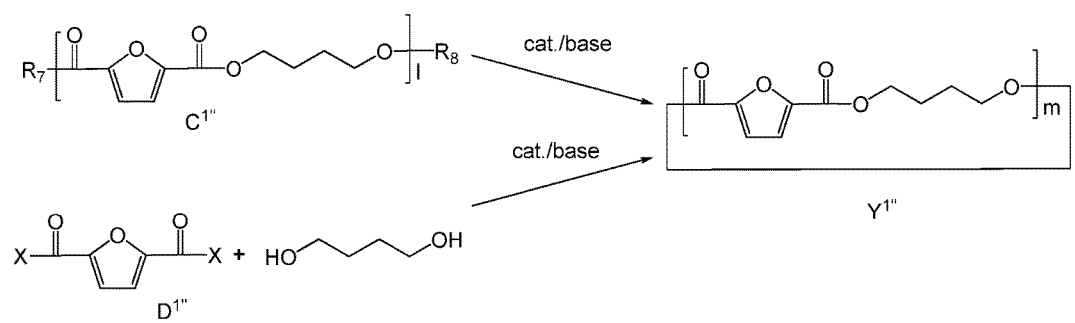
FIG. 4 shows a reaction scheme for the synthesis of a specific cyclic polyester oligomer useful in the production of PBF and having furanic units and of structure $Y^{1''}$ from the reaction of a specific monomer component $C^{1''}$ or $D^{1''}$ in a ring closing oligomerization step.
Figure 5:
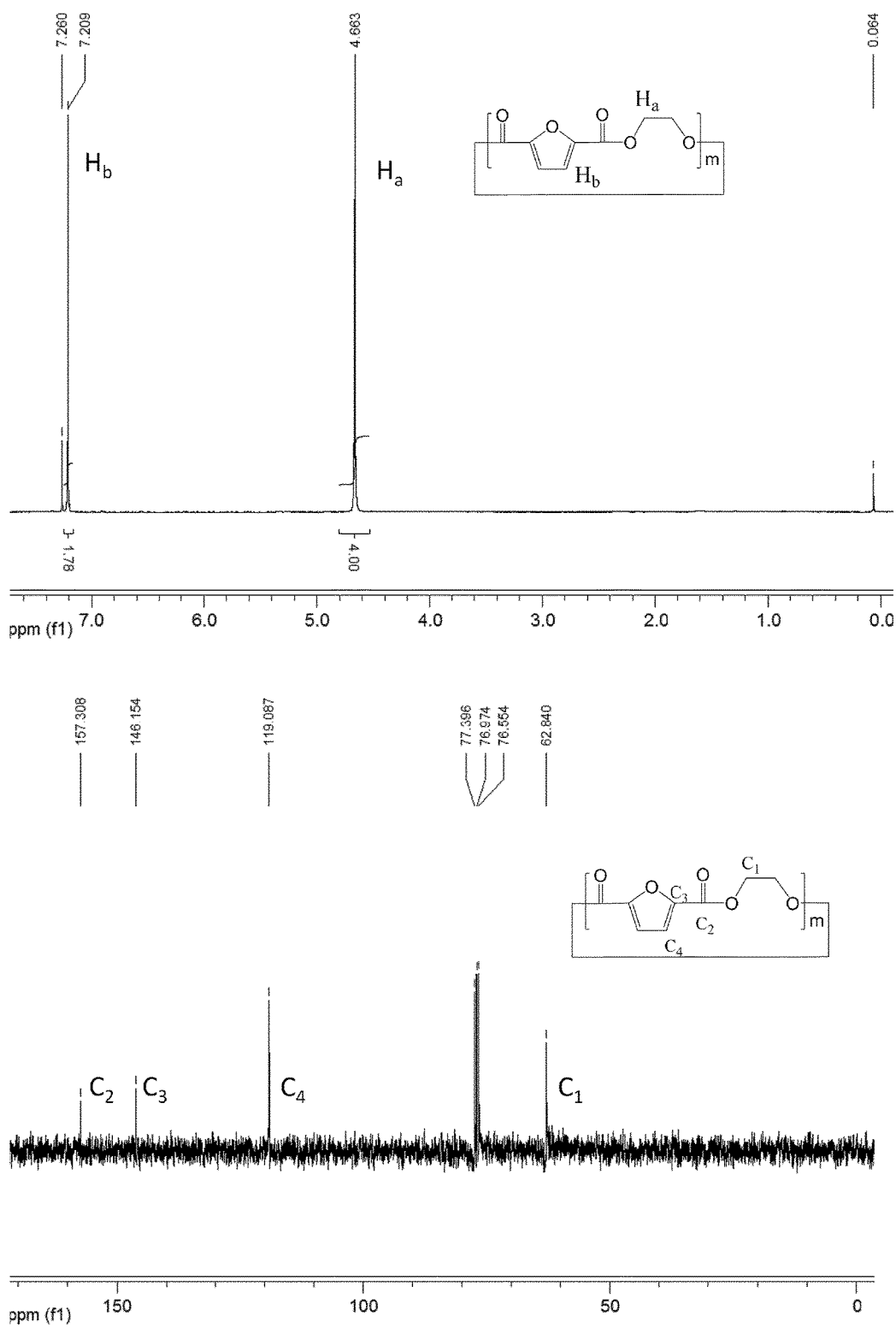
FIG. 5 Example 1 Cyclic Polyester Oligomer Composition (Embodiment of $Y^{1'}$) For Production Of PEF: a) $^1$H NMR spectrum (300 MHz, CDCl$_3$, 25° C.) b) $^{13}$C NMR spectrum (75 MHz, CDCl$_3$, 25° C.).

FIG. 3 shows a reaction scheme for the synthesis of a specific cyclic polyester oligomer useful in the production of PEF and having furanic units and of structure $Y^{1'}$ from the reaction of a specific monomer component $C^{1'}$ or $D^{1'}$ in a ring closing oligomerization step, and FIG. 4 shows a reaction scheme for the synthesis of a specific cyclic polyester oligomer useful in the production of PBF and having furanic units and of structure $Y^{1'''}$ from the reaction of a specific monomer component $C^{1'''}$ or $D^{1'''}$ in a ring closing oligomerization step, wherein l, m and n are as previously defined for the case of both figures.

Ring-closing oligomerization processes and uses of cyclic oligomers are well known in the art, for example, as disclosed in Cyclic Polymers (Second Edition), edited by J. A. Semlyen, published in 2000 by Kluwer (Springer), Dordrecht (ISBN-13: 9780412830907), or Ring-Opening Polymerization: Kinetics, Mechanisms, and Synthesis, ACS Symposium Series 286, by J. E. McGrath, published in 1985 by ACS (ISBN-13: 978-0894645464), or Macrocycles: Construction, Chemistry and Nanotechnology Applications, by F. Davis and S. Higson, published in 2011 by Wiley, Chichester (ISBN: 978-0-470-71462-1).

Unless specifically indicated otherwise, conventional ring-closing oligomerization processes and their various reagents, operating parameters and conditions may be used in the processes according to the invention in preparing the cyclic polyester oligomers having the structures $Y^1$, $Y^2$, $Y^{1'}$, or $Y^{1'''}$.

The conditions of a reaction temperature and reaction time sufficient to yield a cyclic polyester oligomer having furanic units in the ring-closing oligomerization step are not specifically limited. Sufficient here means that the reaction temperature and time are sufficient to cause a ring-closing reaction to occur such that an oligomer having the claimed values of m is produced from the monomer components. One skilled in the art will understand that appropriate specific reaction temperatures and reaction times may vary somewhat due to the interaction between the reaction temperature and time.

For example, increasing the reaction temperature may allow the reaction to take place in a shorter time, or increasing the reaction time may allow lower reaction temperatures to be used. Lower reaction temperatures and/or shorter reaction times may be appropriate if a lower molecular weight cyclic polyester oligomer is to be produced and/or a lower conversion of monomer component to oligomer may be tolerated. Alternatively, higher reaction temperatures and/or longer reaction times may be appropriate if a higher molecular weight cyclic polyester oligomer is to be produced and/or a higher conversion of monomer component is desired.

Furthermore the use of more effective catalysts or bases or a higher concentration of catalyst or organic base may allow milder reaction conditions (e.g. lower reaction temperatures and shorter reaction times) to be used. Conversely the presence of impurities, particularly catalyst-quenching or chain-stopping impurities may require more intensive reaction conditions.

In one embodiment the reaction temperature is from 100 to 350, preferably 150 to 300, most preferably 180 to 280° C., and the reaction time is from 30 to 600, preferably 40 to 400, most preferably 50 to 300 minutes. In certain specific embodiments, the various specific temperature and time range combinations obtained by combining any of these disclosed ranges may be used. In a more preferred embodiment, these temperature and/or time ranges are used in the ring closing oligomerization step with monomer components $C^1$ or $C^2$.

In another embodiment the reaction temperature is from −10 to 150, preferably −5 to 100, most preferably 0 to 80° C., and the reaction time is from 5 to 240, preferably 10 to 180, most preferably 15 to 120 minutes. In certain specific embodiments, the various specific temperature and time range combinations obtained by combining any of these disclosed ranges may be used. In a more preferred embodiment, these temperature and/or time ranges are used in the ring closing oligomerization step with monomer components $D^1$ or $D^2$.

In the execution of the present invention, any catalyst which is able to catalyze the ring-closing oligomerization to form cyclic polyester oligomers may be used. Suitable catalysts for use in the present invention are those known in the art for polymerization of cyclic esters, such as an inorganic base, preferably a metal alkoxide, a metal carboxylate, or a Lewis acid catalyst. The Lewis acid catalyst may be a metal coordination compound comprising a metal ion having more than one stable oxidation state. Of this class of catalysts, the tin- or zinc-containing compounds are preferred, of which their alkoxides and carboxylates are more preferred, and tin octoate is the most preferred catalyst.

The ring-closing oligomerization step preferably takes place in the presence of an optional organic base. The organic base is not specifically limited, and, it may be an inorganic or organic base. In one embodiment, it has the general structure E, and in other embodiments it is an alkyl amine such as triethylamine or it is pyridine. In still other embodiments, it is a combination of E and an alkyl amine. In this application, a "catalyst" refers to an inorganic or metal-containing compound such as an organometallic species or a metal salt; whereas an "organic base" refers to a non-metallic and basic organic species.

Specific combinations of catalysts and bases may be particularly effective, and their use may be preferred. In one preferred embodiment, the catalyst is a tin, zinc, titanium, or aluminum alkoxide or carboxylate, and the organic base is DABCO (CAS No. 280-57-9) or DBU (CAS No. 83329-50-4), preferably together with triethyl-amine. The monomer component may be in the solid phase when it is mixed with the catalyst and/or organic base. However, bringing the monomer component into the molten phase or a liquid phase using a solvent and then adding the catalyst and/or organic base afterwards is preferred.

The amount of catalyst and/or organic base in the process of the invention is not specifically limited. In general, the amount of catalyst and/or organic base is sufficient to cause a ring-closing oligomerization step to occur for the selected reaction temperature and time such that an oligomer having the claimed values of l is produced from the monomer components. In one embodiment, the catalyst and/or organic base is present, and the catalyst is present in an amount relative to the total weight of the monomer components of from 1 ppm to 1 weight %, preferably from 10 to 1,000 ppm, more preferably from 50 to 500 ppm, and the organic base is present in a stoichiometric ratio of from 0.5 to 6, preferably 1 to 4, more preferably 2 to 3 mol relative to 1 mol of all monomer component species used as a reactant in the process. The concentration of the catalyst and the organic base may be readily determined by the masses or mass flow rates used of these reagents relative to that of the monomer components.

The process to prepare the cyclic polyester oligomer composition of the invention is not specifically limited, and it may be conducted in a batch, semi-continuous, or continuous manner. Oligomerization processes suitable for preparing the cyclic polyester oligomer composition of the invention can be divided into two groups, solution oligomerization in the presence of a solvent, or oligomerization in the substantial absence of solvent, e.g., melt oligomerization, carried out at a temperature above the melting temperature of the monomer components and oligomeric species.

The apparatus suitable for carrying out the oligomerization process of the invention is not specifically limited. For example, batch reactors, stirred tank reactors, plug flow reactors, static mixers, cascades of stirred tank reactors, and continuous flow stirred tank reactors may all be used.

As the presence of substantial amounts of unreacted monomer component, linear oligomers, or other low molecular weight species in the cyclic polyester oligomer composition may detrimentally affect the storage stability and/or polymerization processing behaviour of the oligomer composition, the cyclic polyester oligomer composition is subjected to a step in which linear oligomeric polyester species, as well as optionally other impurities, are removed.

The step in which linear oligomeric polyester species having furanic units, as well as optionally other impurities, are separated and removed from the cyclic polyester oligomer composition of the invention is not specifically limited. Examples of other impurities may be unreacted starting materials such as diacids or diols or residual reagents such as bases or their residues (e.g. amine residues). Separation and purification methods are well-known in the art, for example, as disclosed in Purification of Laboratory Chemicals, Sixth Ed., by W. E. Armarego and C. L. L. Chai, published in 2009 by Elsevier, Oxford (ISBN-13: 978-1856175678), and The Molecular World, Separation, Purification and Identification by L. E. Smart, published in 2002 by the Royal Society of Chemistry, Cambridge (ISBN: 978-1-84755-783-4).

Unless specifically indicated otherwise, conventional separation and purification processes and their various apparatuses, operating parameters and conditions may be used in the processes according to the invention in preparing the cyclic polyester oligomers of structures $Y^1$, $Y^2$, $Y^{1'}$, or $Y^{1''}$ and their compositions.

In one embodiment the separation step in which linear oligomeric species and optionally other impurities are removed comprises one or more separation sub-steps of passing a mobile phase of the cyclic oligomeric composition through a stationary phase, selective precipitation, distillation, extraction, crystallization or their combinations.

In the cyclic polyester oligomer composition product that is obtained after the separation step, linear oligomeric polyester species having furanic units are generally present in an amount of less than 5 wt. %, more in particular in an amount of less than 3 wt. %, still more in particular in an amount of less than 1 wt. % relative to the total weight of the cyclic polyester oligomer composition. The content of linear oligomeric polyester species having furanic units in the cyclic polyester oligomer composition of the invention may be readily determined by conventional methods. For example, the content of linear oligomeric species may be determined by electrospray mass spectrometry, matrix-assisted laser desorption/ionization (MALDI) mass spectrometry, high-performance liquid chromatography (HPLC) method coupled to mass spectronomy, and gel filtration chromatography. In the present application and invention, the concentration of linear oligomeric polyester species having furanic units refers to the concentration as determined by HPLC.

In a preferred embodiment of the composition, the content of residual monomer components, such as $C^1$, $D^1$, $C^2$, or $D^2$, in the cyclic polyester oligomer composition is less than 5, preferably 3, and most preferably 1 weight percent based on the total weight of the composition. The content of such residual monomer components may be determined by FTIR or NMR spectroscopic analysis of the composition. Alternatively the content may be determined by chromatographic methods such as HPLC or GC. In the present application and invention, the concentration of residual monomer components refers to the concentration as determined by HPLC.

After removal, the cyclic polyester oligomer composition may be subjected to secondary operations such as compounding, blending, pelletizing, flaking or various combinations of these operations.

The invention relates to a cyclic polyester oligomer composition comprising a cyclic polyester oligomer having furanic units, wherein the structure of the cyclic polyester oligomer having furanic units is $Y^1$ or $Y^2$, and wherein the polyester polymer composition is obtainable with the above-described method. Said cyclic polyester oligomer composition is characterized in that the composition contains less than 5%, preferably 3, most preferably 1 weight % of linear oligomeric polyester species having furanic units relative to the total weight of the composition. Such oligomer compositions can answer most requirements posed by the current polymerization applications.

In another preferred embodiment, the composition comprises a halogenated impurity, preferably an acid chloride and/or its residue. Methods of detection of halogenated impurities in oligomers are well-known and include combustion ion chromatography (IC), optical atomic spectroscopy, and X-ray fluorescence analysis (XRF). However halogenated species may be corrosive and thus require special expensive construction materials for the subsequent polymerization plant. Therefore their content in the cyclic polyester oligomer composition of the invention will preferably be kept low, e.g. by removal during the subsequent separation and removal step.

In a preferred embodiment of the cyclic polyester oligomer composition, the specific cyclic polyester oligomer having furanic units is one of structure $Y^{1'}$ or $Y^{1''}$, wherein m is an integer from 1 to 20, preferably 2 to 15, most preferably 3 to 10.

Yet another aspect of the present invention is a process to produce a polyester polymer comprising (i) the process of the invention to prepare a cyclic oligomer composition comprising a cyclic polyester oligomer having furanic units together with (ii) a subsequent polymerization step to produce a polyester polymer. Related to this aspect is the aspect of the use of the cyclic polyester oligomer composition of the invention in the production of a polyester polymer. Preferred embodiments of this process or use are those in which the polyester polymer is a PEF polymer or a PBF polymer.

EXAMPLES

The following examples are set forth to provide those of ordinary skill in the art with a detailed description of how the processes, polyester polymer compositions, and uses claimed herein are evaluated, and they are not intended to limit the scope of what the inventors regard as their invention.

In these examples, the following characterization methods are parameters were used for the characterization of the cyclic polyester oligomer compositions prepared in the examples.

GPC

An Agilent 1100 Series GPC equipped with an Agilent Oligopore, 7.5×300 mm column using THF as solvent at a flow rate of 0.5 mL/min, with an injection size of 20 μL, and operating at a temperature of 30° C. was used. Detection was made using a UV detector at 280 nm.

FT-IR

A Nicolet Nexus 870 ESP was used and 100 scans were made with a 8 cm$^{-1}$ step size.

$^1$H NMR

Measurements were made on a Bruker AV 300 spectrometer operating at a frequency of 300 MHz and using CDCl$_3$ as solvent.

$^{13}$C NMR

Measurements were made on a Varian Mercury 300 spectrometer operating at a frequency of 75 MHz and using CDCl$_3$ as solvent.

HPLC

An Agilent 1200 Series HPLC equipped with an Agilent Eclipse XDB-C18, 5 m, 4.6×150 mm column was used. The solvent mixture was composed of the buffers: (A) MQ water stabilized with 1 mL H3PO4 (85%) per liter, and (B) THF/Water (9:1 by volume) stabilized with 1 mL H3PO4 (85%) per liter, and the method was to change from 40% B to 80% over 25 minutes, followed by 10 minutes at 80% and 10 minutes at 40% to reequilibrate the column. The flow rate was 1 mL/min, the injection size was 10 μL, and the temperature was 30° C. and UV detection was carried out at 280 nm.

MALDI-TOF

The matrix was T-2-[3-(4-t-Butyl-phenyl)-2-methyl-2-propenylidene]malononitrile (DCTB)+Na Mix 10:1, and the instrument type was a Bruker Daltonics Ultraflex II, and the acquisition mode was reflector.

Figure 6:
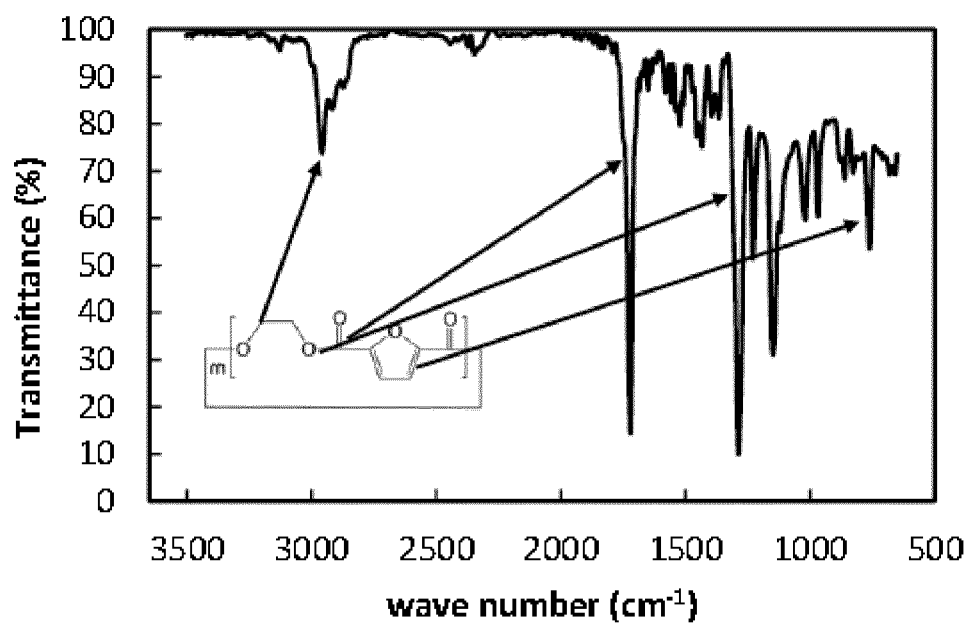
FIG. 6 FT-IR spectrum of Example 1 Embodiment Of $Y^{1'}$
Figure 7:
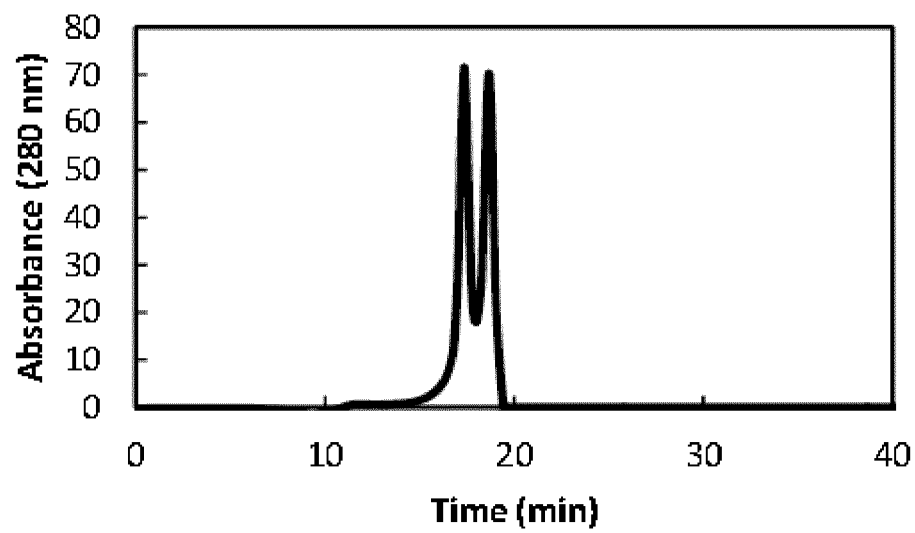
FIG. 7 GPC trace of Example 1 Embodiment Of $Y^{1'}$ (m=2, 3); solvent (THF) signal subtracted for clarity FIG. 8 HPLC trace of (m=2, 3) Example 1 Embodiment Of $Y^{1'}$ FIG. 9 Example 2 Cyclic Polyester Oligomer Composition (Embodiment of $Y^{1''}$) For Production Of PBF: a) $^1$H NMR spectrum (300 MHz, CDCl$_3$, 25° C.), b) $^{13}$C NMR spectrum (75 MHz, CDCl$_3$, 25° C.)
Figure 8:
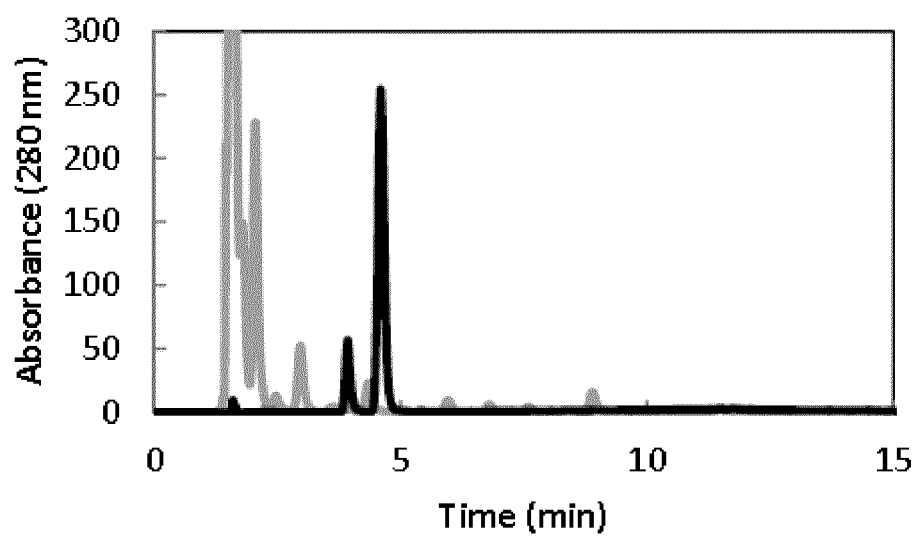
Figure 9:
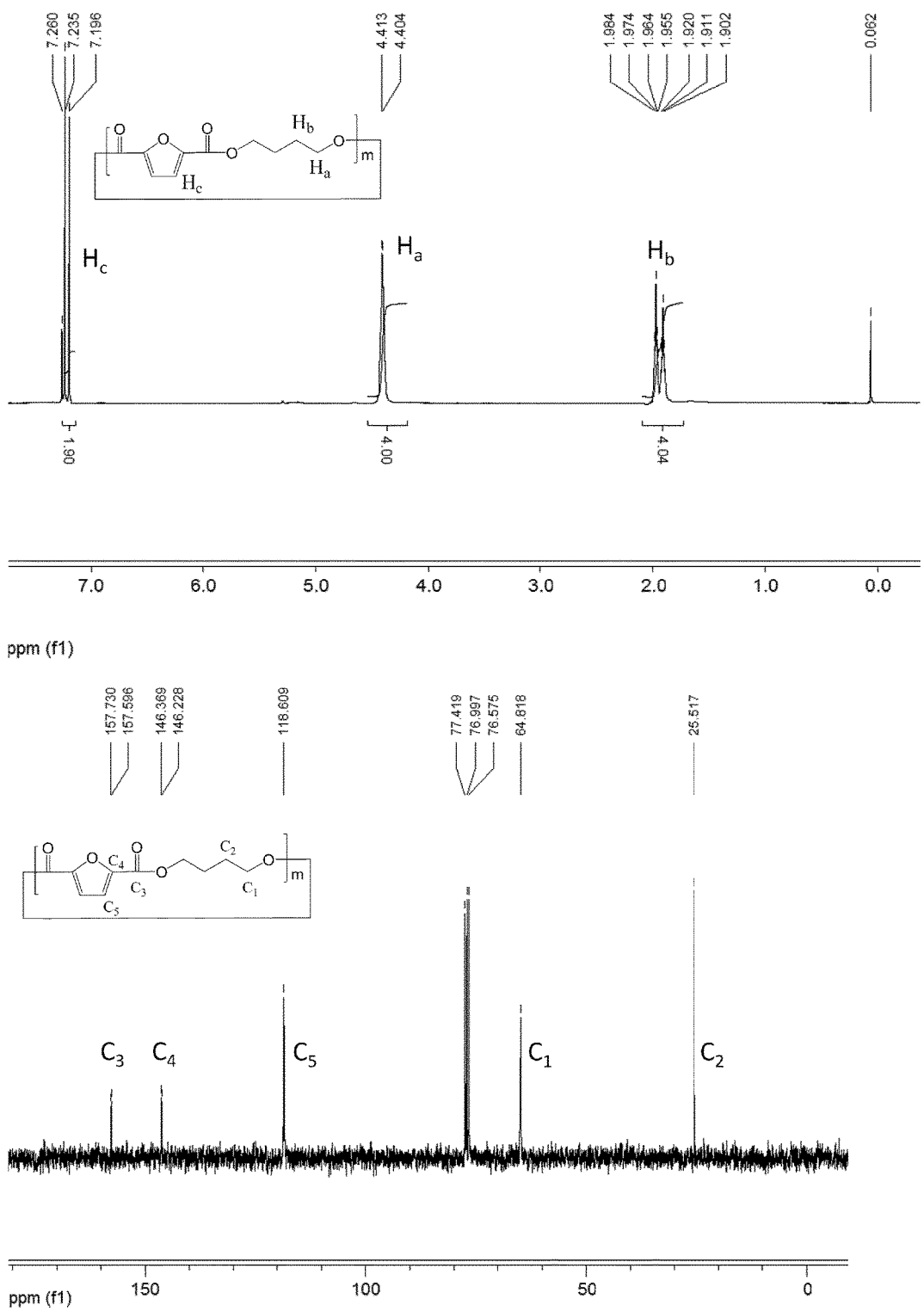

Example 1: A Cyclic Polyester Oligomer Composition (Embodiment of $Y^{1'}$) for Production of PEF In this example, the preparation is described of the cyclic polyester oligomer shown in FIG. 3, which may then subsequently be used to prepare PEF, poly(2,5-ethylene furandicarboxylate). A solution of furan-2,5-dicarbonyl dichloride (102 mg, 5.3·10$^{-4}$ mol) in tetraydrofuran (1 mL) and a solution of ethylene glycol (31 mg, 5.0·10$^{-4}$ mol) in tetraydrofuran (1 mL) were added to a solution of 1,4-diazabicyclo[2.2.2]octane (DABCO) (140 mg, 1.3·10$^{-3}$ mol) in CH$_2$Cl$_2$ at 0° C., over a period of 30 minutes, maintaining constant the 1.05:1 stoichiometry. The mixture was kept under nitrogen atmosphere and stirring was continued at 0° C. for 60 minutes. A small portion of furan-2,5-dicarbonyl dichloride (5 mg, 2.6·10$^{-5}$ mol) was finally added and stirring was continued for 10 minutes. The reaction was quenched by addition of 1:1 H$_2$O/NaOH mixture (12 μL). Linear chain species were partially removed by filtration. The organic phase was washed with 1M HCl and H$_2$O, filtered and concentrated to dryness. Flash chromatography (SiO$_2$; CH$_2$Cl$_2$/Et$_2$O 9:1) gave a purified mixture of PEF cyclics. FIG. 6 shows a typical IR-spectrum for a purified mixture of PEF cyclics ($Y^{1'}$); FIGS. 7 and 8 feature respectively a representative GPC and HPLC trace for embodiment of $Y^{1'}$, where m is mainly equal to 2 and 3

$^1$H NMR (300 MHz, CDCl$_3$, 25° C.): δ=4.66 (4H; H$_a$), 7.20 (2H, H$_b$); $^{13}$C NMR (75 MHz, CDCl$_3$, 25° C.): 62.8 (C$_1$), 119.1 (C$_4$), 146.1 (C$_3$), 157.3 (C$_2$); MALDI-TOF-MS: m/z: 386.89 ([M$_2$+Na]$^+$, calcd for C$_{16}$H$_{12}$O$_{10}$Na$^+$: 387.03), 568.92 ([M$_3$+Na]$^+$, calcd for C$_{24}$H$_{16}$O$_{16}$Na$^+$: 569.05), 751.03 ([M$_4$+Na]$^+$, calcd for C$_{32}$H$_{24}$O$_{20}$Na$^+$: 751.08), 933.08 ([M$_5$+Na]$^+$, calcd for C$_{40}$H$_{30}$O$_{25}$Na$^+$: 933.10), 1115.13 ([M$_6$+Na]$^+$, calcd for C$_{48}$H$_{36}$O$_{30}$Na$^+$: 1115.12), 1297.15 ([M$_7$+Na]$^+$, calcd for C$_{56}$H$_{42}$O$_{35}$Na$^+$: 1297.14), 1479.17 ([M$_8$+Na]$^+$, calcd for C$_{64}$H$_{48}$O$_{40}$Na$^+$: 1479.16), 1661.18 ([M$_9$+Na]$^+$, calcd for C$_{72}$H$_{54}$O$_{45}$Na$^+$: 1661.18); FT-IR (neat): ν=2958-2918 (w), 1721 (s), 1288 (s), 760 cm$^{-1}$ (m).

Figure 10:
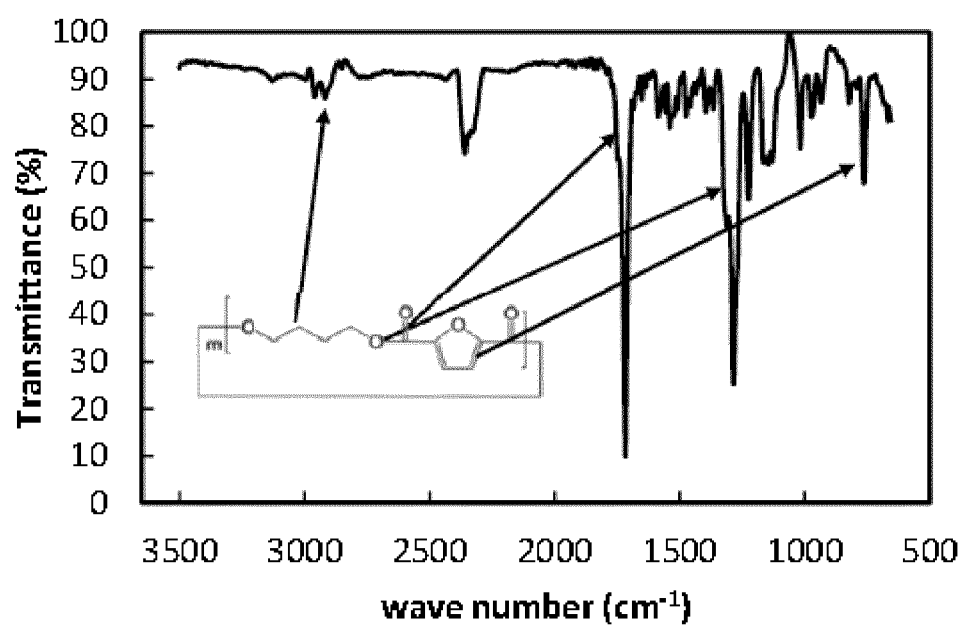
FIG. 10 FT-IR spectrum Of Example 2 Embodiment Of $Y^{1''}$
Figure 11:
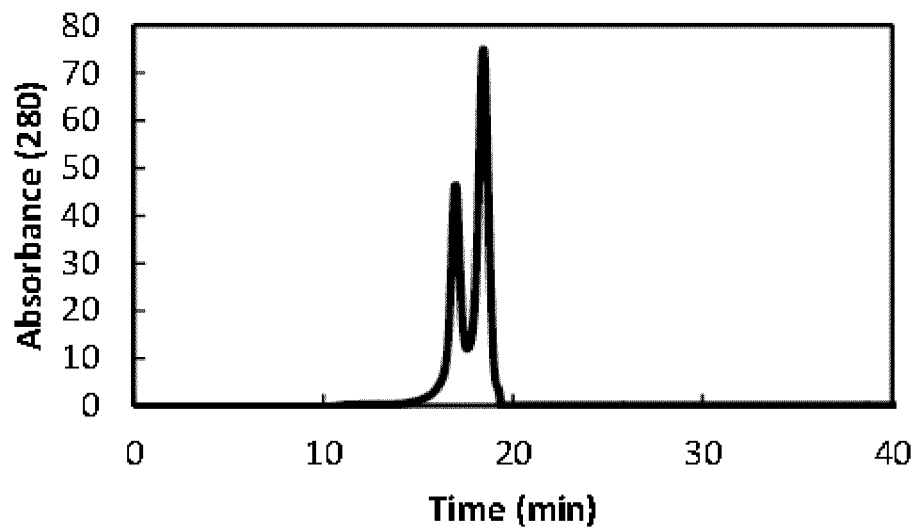
FIG. 11 GPC trace of Example 2 Embodiment Of $Y^{1''}$ (m=2, 3); solvent (THF) signal subtracted for clarity FIG. 12 HPLC trace of Example 2 Embodiment Of $Y^{1''}$ (m=2, 3)
Figure 12:
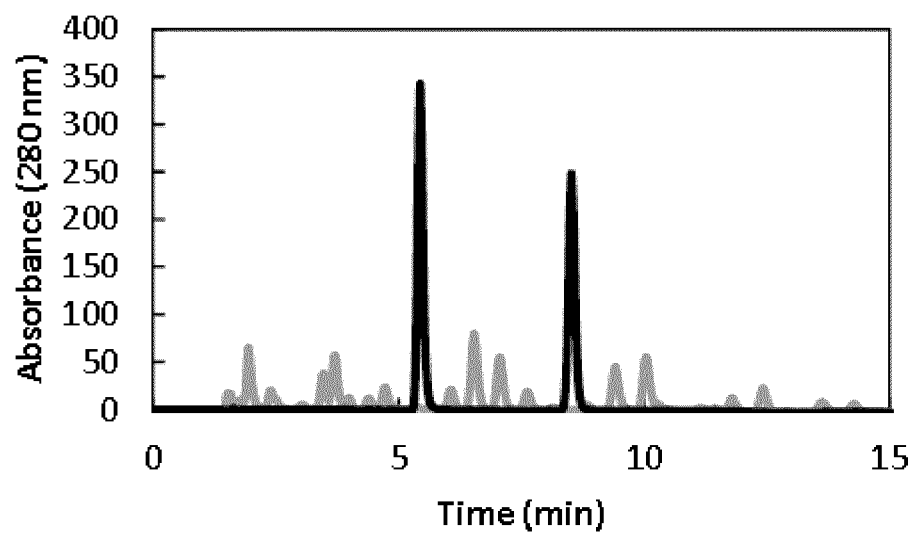

Example 2: A Cyclic Polyester Oligomer Composition (Embodiment of $Y^{1''}$) for Production of PBF In this example, the preparation is described of the cyclic polyester oligomer shown in FIG. 4, which may then subsequently be used to prepare PBF, poly(2,5-butylene furandicarboxylate). A solution of furan-2,5-dicarbonyl dichloride (102 mg, 5.3·10$^{-4}$ mol) in tetraydrofuran (1 mL) and a solution of butylene glycol (45 mg, 5.0·10$^{-4}$ mol) in tetraydrofuran (1 mL) were added to a solution of 1,4-diazabicyclo[2.2.2]octane (DABCO) (140 mg, 1.3·10$^{-3}$ mol) in CH$_2$Cl$_2$ at 0° C., over a period of 30 minutes, maintaining constant the 1.05:1 stoichiometry. The mixture was kept under nitrogen atmosphere and stirring was continued at 0° C. for 60 minutes. A small portion of furan-2,5-dicarbonyl dichloride (5 mg, 2.6·10$^{-5}$ mol) was finally added and stirring was continued for 10 minutes. The reaction was quenched by addition of 1:1 H$_2$O/NaOH mixture (12 μL). Linear chain oligomer species were partially removed by filtration. The organic phase was washed with 1M HCl and H$_2$O, filtered and concentrated to dryness. Flash chromatography (SiO$_2$; CH$_2$Cl$_2$/Et$_2$O 9:1) gave a purified mixture of PBF cyclics. FIG. 10 shows a typical IR-spectrum for a purified mixture of PBF cyclics ($Y^{1''}$); FIGS. 11 and 12 feature respectively a representative GPC and HPLC trace for embodiment of $Y^{1''}$, where m is mainly equal to 2 and 3.

$^1$H NMR (300 MHz, CDCl$_3$, 25° C.): δ=1.95 (4H; H$_b$), 4.41 (4H, H$_a$), 7.22 (2H, H$_c$); $^{13}$C NMR (75 MHz, CDCl$_3$, 25° C.): 25.5 (C$_2$), 64.8 (C$_1$), 118.6 (C$_5$), 146.4 (C$_4$), 157.7 (C$_3$); MALDI-TOF-MS: m/z: 442.92 ([M$_2$+Na]$^+$, calcd for C$_{20}$H$_{20}$O$_{10}$Na$^+$: 443.36), 653.05 ([M$_3$+Na]$^+$, calcd for C$_{30}$H$_{30}$O$_{15}$Na$^+$: 653.15), 863.13 ([M$_4$+Na]$^+$, calcd for C$_{40}$H$_{40}$O$_{20}$Na$^+$: 863.20), 1073.19 ([M$_5$+Na]$^+$, calcd for C$_{50}$H$_{50}$O$_{25}$Na$^+$: 1073.25), 1283.25 ([M$_6$+Na]$^+$, calcd for C$_{60}$H$_{60}$O$_{30}$Na$^+$: 1283.31), 1493.29 ([M$_7$+Na]$^+$, calcd for C$_{70}$H$_{70}$O$_{35}$Na$^+$: 1493.36), 1703.33 ([M$_8$+Na]$^+$, calcd for C$_{80}$H$_{80}$O$_{40}$Na$^+$: 1703.41); FT-IR (neat): ν=2960-2919 (w), 1716 (s), 1285 (s), 764 cm$^{-1}$ (m).

Example 3: A Cyclic Polyester Oligomer Composition (Embodiment of $Y^{1'}$) for Production of PEF In this example, the preparation is described of the cyclic polyester oligomer shown in FIG. 3, which may then subsequently be used to prepare PEF, poly(2,5-ethylene furandicarboxylate).

Zinc acetate (6 mg) was added to a solution of hydroxy-terminated polyester oligomers (200 mg) in 1-methylnaphthalene (20 mL). The solution was heated to 230° C. for 24 h. The reaction was then cooled to 130° C. and the solvent was removed under vacuum. 100 mL of hexane was added to the mixture, inducing the precipitation of the crude products. The solvent mixture was removed by decantation. The precipitate was repeatedly washed with hexane (2×60 mL), and recovered by vacuum filtration. Flash chromatography (SiO$_2$; CH$_2$Cl$_2$/MeOH 97:3) gave a purified mixture of PEF cyclics. The cyclic nature of the isolated products was confirmed by MALDI-TOF MS. MALDI-TOF-MS: m/z: 386.86 ([M$_2$+Na]$^+$, calcd for C$_{16}$H$_{12}$O$_{10}$Na$^+$: 387.03), 568.94 ([M$_3$+Na]$^+$, calcd for C$_{24}$H$_{15}$O$_{15}$Na$^+$: 569.05), 751.00 ([M$_4$+Na]$^+$, calcd for C$_{32}$H$_{24}$O$_{20}$Na$^+$: 751.08), 933.04 ([M$_5$+Na]$^+$, calcd for C$_{40}$H$_{30}$O$_{25}$Na$^+$: 933.10), 1115.06 ([M$_6$+Na]$^+$, calcd for C$_{48}$H$_{36}$O$_{30}$Na$^+$: 1115.12), 1297.07 ([M$_7$+Na]$^+$, calcd for C$_{56}$H$_{42}$O$_{35}$Na$^+$: 1297.14), 1479.06 ([M$_8$+Na]$^+$, calcd for C$_{64}$H$_{48}$O$_{40}$Na$^+$: 1479.16), 1661.18 ([M$_9$+Na]$^+$, calcd for C$_{72}$H$_{54}$O$_{45}$Na$^+$: 1661.18);

Hydroxy-terminated polyester oligomers were conveniently prepared as follow: furandicarboxylic acid (FDCA) (800 mg, 5.12 5.0·10$^{-3}$ mol) was reacted with an excess of ethylenglycol (3 mL, 8.97 5.0·10$^{-2}$ mol) in a 5-mL glass reactor equipped with a magnetic stirrer, a nitrogen inlet and a distillation head connected to a condenser and a receiver flask. The reactor was heated to 190° C. and temperature was raised gradually to 220° C. under nitrogen, while excess diol distilled off. After 1.5 hour 2.5 mL of fresh diol was added and the reaction was continued again for 1.5 hours, distilling off the excess diol. The reaction was indeed cooled to 190° C., vacuum was applied and the reactor was sealed. The reaction was continued for 2 hours at this temperature. Finally, 1 mg of Ti(OBu)$_4$ was added and the reaction continued for 3 h at 220° C. in vacuum. Reaction was quenched by concentration to dryness. Polyester oligomers were washed with chloroform, to remove catalyst traces. Next they were suspended in hexane, recovered by vacuum filtration and used without additional purification in the following ring-closing reaction.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:
1. A process to prepare a cyclic polyester oligomer composition comprising a cyclic polyester oligomer having furanic units, wherein the process comprises:
a step of either:
(I) reacting a monomer component C$^1$ or D$^1$ in the presence of an optional catalyst and/or optional organic base in a ring closing oligomerization step under conditions of a reaction temperature and reaction time sufficient to yield a cyclic polyester oligomer having furanic units and of structure Y$^1$, wherein the monomer component C$^1$ comprises the structure

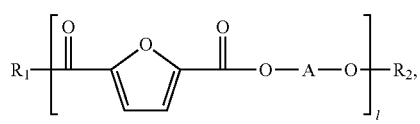

and wherein each of the groups A is an optionally-substituted linear, branched or cyclic alkyl, phenyl, aryl, or alkylaryl, and wherein l is an integer from 1 to 100,
and wherein
R$_1$=OH, OR, halogen, or O-A-OH,
R=optionally substituted linear, branched or cyclic alkyl, phenyl, aryl or alkylaryl,
R$_2$=H or

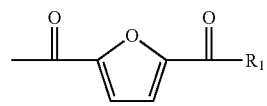

wherein the monomer component D$^1$ comprises the structure

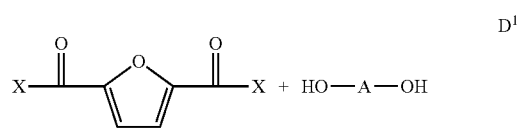

and wherein A is an optionally-substituted linear, branched or cyclic alkyl, phenyl, aryl, or alkylaryl, and wherein each of the groups X is an OH, a halogen, or an optionally-substituted alkyloxy, phenoxy, or aryloxy, and wherein the groups X are not OH when A is n-butyl, and wherein the structure Y$^1$ of the cyclic polyester oligomer having furanic units is

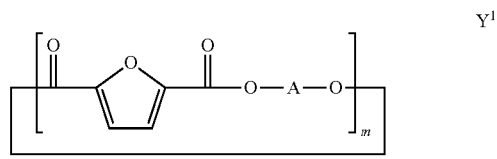

wherein m is an integer from 1 to 20,
OR
(II) reacting a monomer component C$^2$ or D$^2$ in the presence of an optional catalyst and/or optional organic base in a ring closing oligomerization step under conditions of a reaction temperature and reaction time sufficient to yield a cyclic polyester oligomer having furanic units and of structure Y$^2$, wherein the monomer component C$^2$ comprises the structure

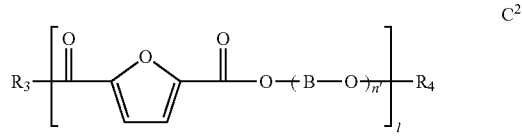

and wherein each of the groups B is an optionally-substituted linear, branched or cyclic alkyl, phenyl, aryl, or alkylaryl, wherein l is an integer as defined above, and wherein n' is an integer from 1 to 20, and wherein
R$_3$=OH, OR, halogen, or O—(B—O)$_n$—H,
R=optionally substituted linear, branched or cyclic alkyl, phenyl, aryl or alkylaryl, $R_4$=H or

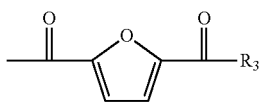

the monomer component $D^2$ comprises the structures

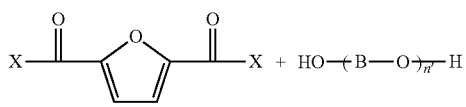

and wherein each of the groups X is an OH, a halogen, or an optionally-substituted alkyloxy, phenoxy, or aryloxy, each of the groups B is an optionally-substituted linear, branched or cyclic alkyl, phenyl, aryl, or alkylaryl, and n' is an integer as defined above, and wherein the structure $Y^2$ of the cyclic polyester oligomer having furanic units is

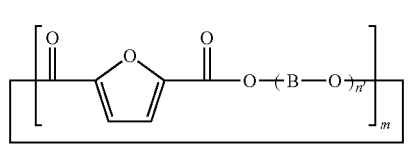

wherein each of the groups B is an optionally-substituted linear, branched or cyclic alkyl, phenyl, aryl, or alkylaryl, n' is an integer as defined above, and m is an integer from 1 to 20, AND a subsequent step (III) in which linear oligomeric polyester species having furanic units are separated and removed from the cyclic oligomeric composition.

2. The process of claim 1, wherein either:
(I)—the monomer component is $C^1$ and A is an optionally-substituted linear, branched or cyclic alkyl, l is an integer from 3 to 25,
OR
the monomer component is $D^1$ and A is an optionally-substituted linear, branched or cyclic alkyl, X is a halogen, or optionally-substituted alkyloxy or phenoxy, and m is as defined previously in this claim, and wherein the structure of the cyclic polyester oligomer having furanic units is one of $Y^1$,
OR
(II)—the monomer component is $C^2$ and wherein B is an optionally-substituted linear, branched or cyclic alkyl, l and m are integers as defined above, and n' is an integer from 2 to 10,
OR
the monomer component is $D^2$, and wherein X is an OH, a halogen, or optionally-substituted alkyloxy, phenoxy, or aryloxy, B is an optionally-substituted linear, branched or cyclic alkyl, or phenyl, and n' and m are integers as defined previously in this claim, and wherein the structure of the cyclic polyester oligomer having furanic units is one of $Y^2$.

3. The process of claim 1, wherein either
the monomer component is $C^1$ and A is an optionally-substituted linear, branched or cyclic $C_1$ to $C_6$ alkyl, and l is an integer from 3 to 25, and m is an integer from 3 to 10,
the monomer component is $D^1$ and A is an optionally-substituted linear, branched or cyclic $C_1$ to $C_6$ alkyl, X is a halogen, or optionally-substituted alkyloxy or phenoxy, and m is an integer as defined above,
the monomer component is $C^2$ and wherein B is an optionally-substituted linear, branched or cyclic $C_1$ to $C_6$ alkyl, l and m are integers as defined above and n' is an integer from 2 to 10,
OR
the monomer component is $D^2$, X is a halogen, or an optionally-substituted alkyloxy, phenoxy, or aryloxy, B is an optionally-substituted linear, branched or cyclic $C_1$ to $C_6$ alkyl, or phenyl, and n' and m are integers as defined in claim 2.

4. The process of claim 1, wherein the monomer component is $C^1$ or $C^2$ and the reaction temperature is from 100 to 350° C., and wherein the reaction time is from 30 to 600 minutes,
OR
wherein the monomer component is $D^1$ or $D^2$ and the reaction temperature is from −10 to 150° C., and wherein the reaction time is from 5 to 240 minutes.

5. The process of claim 1, wherein either the monomer component $C^1$ comprises the specific structure

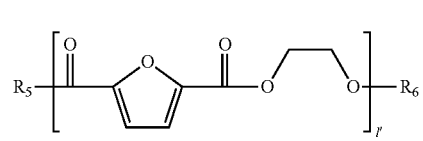

or the monomer component $D^1$ comprises the specific structure

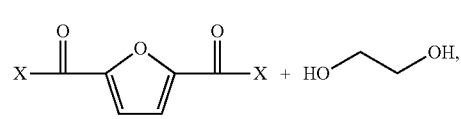

and the structure $Y^1$ of the cyclic polyester oligomer having furanic units is the specific structure

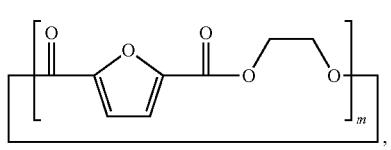

wherein
$R_5$=OH, OR, halogen, or O—$CH_2CH_2$—OH,
R=optionally substituted linear, branched or cyclic alkyl, phenyl, aryl or alkylaryl, $R_6$=H or

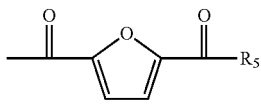

and X, l, and m are defined as indicated in the previous claim on which this claim depends.

6. The process of claim 1, wherein either the monomer component $C^1$ comprises the specific structure $C^{1'''}$

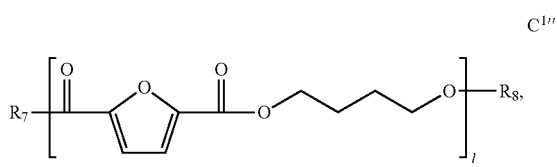

or the monomer component $D^1$ comprises the specific structure $D^{1'''}$

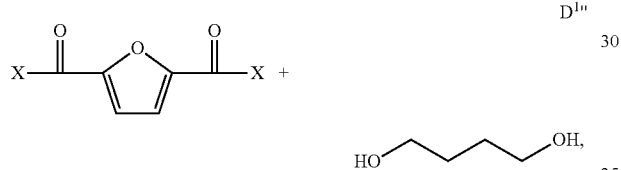

and the structure $Y^1$ of the cyclic polyester oligomer having furanic units is the specific structure $Y^{1'''}$

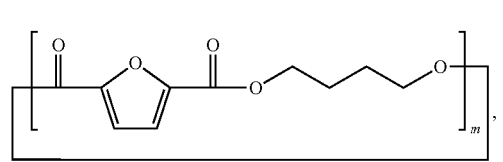

$R_7$=OH, OR, halogen, or O—CH$_2$CH$_2$ CH$_2$CH$_2$—OH,

R=optionally substituted linear, branched or cyclic alkyl, phenyl, aryl or alkylaryl, $R_8$=H or

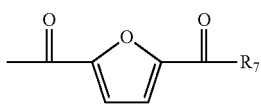

and X, l, and m are defined as indicated in the previous claim on which this claim depends.

7. The process of claim 1, wherein the optional organic base E is present and it is a monoamine compound or a compound having the structure

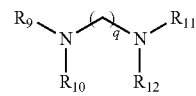

wherein each of the groups $R_9$ to $R_{12}$ are hydrogen, optionally-substituted alkyl, phenyl, aryl, or alkaryl, and wherein each of the groups $R_9$ to $R_{12}$ may optionally be bonded together by a single or double bond group as part of a cyclic substituent in a cyclic optional organic base E.

8. The process of claim 1, wherein the optional organic base E is present and it is either:

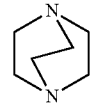

(i) DABCO, having the structure:
OR
(ii) DBU, having the structure:

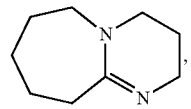

and wherein DABCO or DBU are optionally used together with an alkyl amine.

9. The process of claim 1, wherein the optional catalyst is either absent or it is present and it is a metal alkoxide or metal carboxylate.

10. The process of claim 1, wherein the optional organic base E is present in a stoichiometric ratio of from 0.5 to 6 mol relative to 1 mol of all monomer component species used as a reactant in the process.

11. The process of claim 1, wherein the step (III) in which linear oligomeric polyester species having furanic units are separated and removed from the cyclic oligomeric composition comprises one or more separation sub-steps of passing a mobile phase of the cyclic oligomeric composition through a stationary phase, selective precipitation, distillation, extraction, crystallization or their combinations.

12. A cyclic polyester oligomer composition made by the process according to claim 1, wherein the composition contains less than 5 weight % of linear oligomeric polyester species having furanic units relative to the total weight of the composition.

13. The cyclic polyester oligomer composition of claim 12, wherein the composition contains a halogenated impurity.

14. The cyclic polyester oligomer composition of claim 12, wherein the composition comprises the specific cyclic polyester oligomer having furanic units of structure $Y^{1'}$

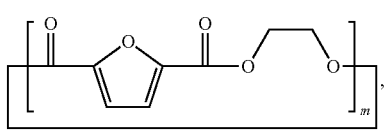

wherein m is an integer from 1 to 20.

15. The cyclic polyester oligomer composition of claim 12, wherein the composition comprises the specific cyclic polyester oligomer having furanic units of structure $Y^{1''}$

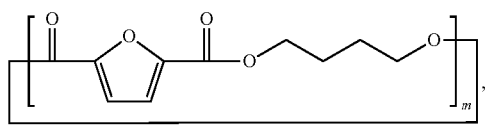

wherein m is an integer from 1 to 20.

16. A process for preparing a polyester polymer, the process comprising the steps of:
   obtaining the cyclic polyester oligomer composition of claim 12 and using it in the production of a polyester polymer.

17. The process of claim 16, wherein the polyester polymer is:

(i) a PEF polymer comprising the structure

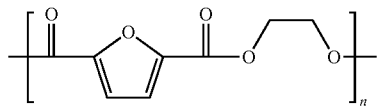

OR (ii) a PBF polymer comprising the structure

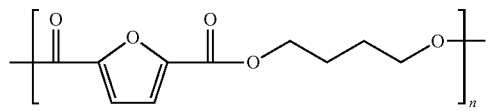

wherein n is an integer from 10 to 100,000.

* * * * *